(12) United States Patent
Xin

(10) Patent No.: US 11,350,368 B2
(45) Date of Patent: May 31, 2022

(54) METHOD FOR DETERMINATING TRANSMISSION RATE AND APPARATUS, TRANSMISSION DEVICE, AND STORAGE MEDIUM

(71) Applicant: ZTE Corporation, Shenzhen (CN)

(72) Inventor: Yang Xin, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/054,090

(22) PCT Filed: Dec. 12, 2018

(86) PCT No.: PCT/CN2018/120706
§ 371 (c)(1),
(2) Date: Nov. 9, 2020

(87) PCT Pub. No.: WO2020/010797
PCT Pub. Date: Jan. 16, 2020

(65) Prior Publication Data
US 2021/0306954 A1 Sep. 30, 2021

(30) Foreign Application Priority Data
Jul. 13, 2018 (CN) .......................... 201810771801.6

(51) Int. Cl.
*H04L 1/00* (2006.01)
*H04W 52/02* (2009.01)
(52) U.S. Cl.
CPC ....... *H04W 52/0245* (2013.01); *H04L 1/0002* (2013.01); *H04W 52/0258* (2013.01); *H04W 52/0261* (2013.01)

(58) Field of Classification Search
CPC ......... H04W 52/0245; H04W 52/0258; H04W 52/0261; H04L 1/0002
(Continued)

(56) References Cited

U.S. PATENT DOCUMENTS 6,898,438 B1 * 5/2005 Uchida .................. G06F 1/3203
455/522
2006/0270385 A1 11/2006 Morris
(Continued)

FOREIGN PATENT DOCUMENTS

CN 101772139 A 7/2010
CN 103200318 A 7/2013
(Continued)

OTHER PUBLICATIONS

The State Intellectual Property Office of People's Republic of China. First Office Action for CN Application No. 201810771801.6 and English translation, dated Sep. 22, 2021, pp. 1-7.
(Continued)

*Primary Examiner* — Gbemileke J Onamuti
(74) *Attorney, Agent, or Firm* — Vivacqua Crane, PLLC

(57) ABSTRACT

A method for determining transmission rate, an apparatus, a transmission device, and a storage medium. The method includes: determining at least two candidate transmission rates; performing data transmission for a period of time at each of the candidate transmission rates; determining an energy utilization rate of battery power during the data transmission at each of the candidate transmission rates; and selecting a target transmission rate for subsequent data transmission from the candidate transmission rates according to the energy utilization rate.

13 Claims, 6 Drawing Sheets

(58) Field of Classification Search
USPC ........................................................ 370/311
See application file for complete search history.

(56) References Cited

U.S. PATENT DOCUMENTS

| | | | |
|---|---|---|---|
| 2013/0223265 A1* | 8/2013 | Yomo | .................... H04B 1/406 |
| | | | 370/252 |
| 2015/0189537 A1 | 7/2015 | Chang et al. | |
| 2017/0170876 A1 | 6/2017 | Weaver et al. | |
| 2018/0049125 A1 | 2/2018 | Damola et al. | |
| 2018/0253757 A1* | 9/2018 | Foladare | ................ G06Q 30/02 |

FOREIGN PATENT DOCUMENTS

| | | |
|---|---|---|
| CN | 103814540 A | 5/2014 |
| CN | 104780014 A | 7/2015 |
| CN | 105745595 A | 7/2016 |
| CN | 107135526 A | 9/2017 |
| CN | 108170370 A | 6/2018 |
| KR | 20130069676 A | 6/2013 |

OTHER PUBLICATIONS

The State Intellectual Property Office of People's Republic of China. First Search Report, for CN Application No. 201810771801.6 and English translation, dated Sep. 13, 2021, pp. 1-5.

* cited by examiner

METHOD FOR DETERMINATING TRANSMISSION RATE AND APPARATUS, TRANSMISSION DEVICE, AND STORAGE MEDIUM

CROSS-REFERENCE TO RELATED APPLICATION

This application is a national stage filing under 35 U.S.C. § 371 of international application number PCT/CN2018/120706, filed Dec. 12, 2018, which claims priority to Chinese patent application No. 201810771801.6 filed Jul. 13, 2018. The contents of these applications are incorporated herein by reference in their entirely.

TECHNICAL FIELD

The present disclosure relates to the field of communication, and in particular to a method for determining transmission rate, an apparatus, a transmission device, and a storage medium.

BACKGROUND

With the development of the Internet of Things (IoT), shared bicycles, electronic visual doorbells, intelligent parking spaces, intelligent water meters and other devices are constantly emerging. These devices provide users with services on the basis of networks, which greatly changes the traditional lifestyle of the users and facilitates the production and life of the users. These IoT devices provide users with services on the basis of networks, which basically involves data transmission with other devices. For example, for the electronic visual doorbells, the storage space is limited, so it may be necessary to transmit the stored data to a server regularly in order to vacate the storage space to store new data. Similar to the shared bicycles, it may be necessary to upload the collected driving data, device damage or the like to a service platform regularly, so that the service platform maintains the shared bicycles in time according to the received data.

Data transmission will undoubtedly consume the battery power of devices, and these devices are basically powered by batteries, so the battery life becomes an important factor affecting the user experience. However, the related transmission schemes basically only pay attention to data transmission without considering the power consumption caused by data transmission, thus resulting in the problems of high power consumption, short battery life and low user experience during data transmission.

SUMMARY

A method for determining transmission rate, an apparatus, a transmission device and a storage medium provided by the embodiments of the present disclosure mainly deal with the technical problem that the power consumption caused by data transmission is not taken into consideration in the related transmission schemes, resulting in high power consumption, short battery life of the device and low user experience during data transmission.

In order to deal with the above technical problem, the embodiments of the present disclosure provide a method for determining transmission rate, including:
 determining at least two candidate transmission rates;
 performing data transmission for a period of time at each of the candidate transmission rates;
 determining an energy utilization rate of battery power during the data transmission at each of the candidate transmission rates; and
 selecting a target transmission rate for subsequent data transmission from the candidate transmission rates according to the energy utilization rate.

The embodiments of the present disclosure further provide an apparatus for determining transmission rate, including:
 a candidate determination module configured to determine at least two candidate transmission rates;
 an experimental transmission module configured to perform data transmission for a period of time at each of the candidate transmission rates;
 an efficiency determination module configured to determine an energy utilization rate of battery power during the data transmission at each of the candidate transmission rates; and
 a rate determination module configured to select a target transmission rate for subsequent data transmission from the candidate transmission rates according to the energy utilization rate.

The embodiments of the present disclosure further provide a transmission device, including a processor, a memory, a communication unit and a communication bus;
 the communication bus configured to realize communication between the processor and the memory and communication between the processor and the communication unit, respectively; and
 the processor configured to execute one or more programs stored in the memory so as to perform any of the steps in the method for determining transmission rate as described above.

The embodiments of the present disclosure further provide a storage medium, wherein the storage medium stores one or more programs that can be executed by one or more processors to perform any of the steps in the method for determining transmission rate as described above.

Other features and corresponding beneficial effects of the present disclosure will be described in the later part of the specification, and it should be understood that at least some of the beneficial effects will become apparent from the records in the specification of the present disclosure.

DETAILED DESCRIPTION

In order to make the objectives, technical schemes and advantages of the present disclosure clearer, the embodiments of the present disclosure will be described below in further detail through specific implementations in conjunction with the drawings. It should be understood that the specific embodiments described herein are used to explain the present disclosure, and shall not be construed to limit the present disclosure.

Embodiment One

In the related art, when a transmission device needs to transmit data to another transmission device, the two transmission devices will communicatively negotiate various communication parameters including, but not limited to a maximum transmission rate. Subsequently, the two transmission devices will transmit data on the basis of the negotiated communication parameters. Therefore, usually, both parties of data transmission use the negotiated maximum transmission rate for data transmission.

Figure 1:
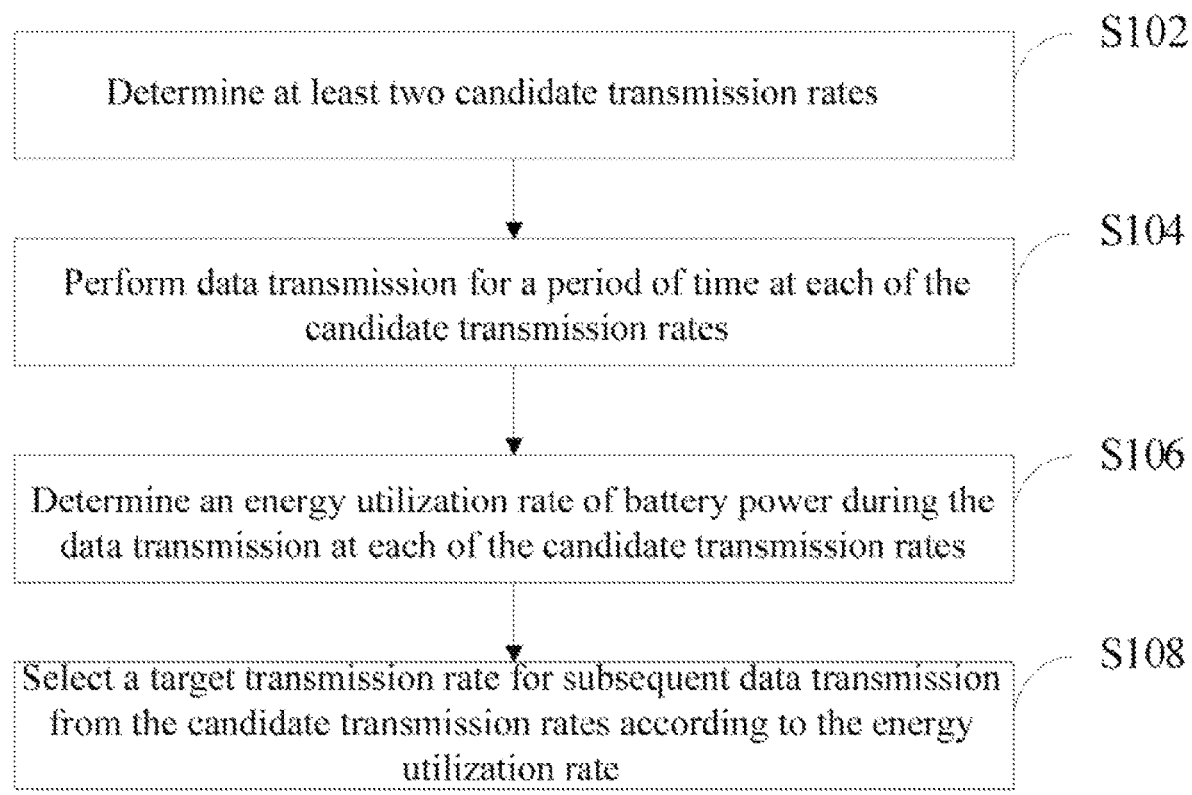
FIG. 1 is a flowchart of a method for determining transmission rate according to Embodiment one of the present disclosure.

Of course, in this case, all data can quickly reach a receiving terminal from a transmitting terminal, and the data can be transmitted in a short time. Therefore, this solution is suitable for transmission scenarios that are highly required in the transmission rate. However, in the case of a high data transmission rate, the power required for data transmission is also relatively high. The high transmission power does not mean a high energy utility rate (i.e., efficiency η). In some transmission scenarios, the data transmission rate is not required, but the power consumption of the transmission device is required. Therefore, in these transmission scenarios, it is no longer suitable for rigid and fixed data transmission at the maximum transmission rate. In view of such transmission scenarios where the power consumption caused by data transmission is required, a scheme for determining a transmission rate is provided. FIG. 1 shows a flowchart of a method for determining transmission rate.

At S102, at least two candidate transmission rates are determined.

The candidate transmission rate is a basis for determining the target transmission rate. In this embodiment, the target transmission rate is determined based on at least two candidate transmission rates. The candidate transmission rate may be randomly determined by a transmission device, or may be determined based on one or some established principles. For example, in an example of this embodiment, the transmission device can select at least two of the transmission rates used recently by this transmission device as candidate transmission rates, that is, the transmission device determines at least two candidate transmission rates on the basis of its own historical transmission rates. If it is assumed that the transmission device used the transmission rates a1, a2, a3 and a4 to transmit data with an opposite device in the last week, during the determination of the transmission rate, the transmission device may select at least two of a1, a2, a3 and a4. It is assumed that three of a1, a2, a3 and a4 are used as candidate transmission rates here.

In other examples of this embodiment, the transmission device may determine the candidate transmission rates on the basis of the maximum transmission rate Vmax currently allowed for this transmission device. It should be understood that the value of each candidate transmission rate determined on the basis of the maximum transmission rate Vmax will not exceed the maximum transmission rate Vmax. The scheme for determining, by the transmission device, candidate transmission rates according to the maximum transmission rate Vmax will be described below.

In a way 1, the transmission device selects $$\frac{a}{N} V\max$$

as the candidate transmission rate, where N is any positive integer, and the values of a consist of each of positive integers less than or equal to N. For example, if it is assumed that N is 10, the a has 10 values, i.e., positive integers from 1 to 10. If it is assumed that N is 4, the values of a consist of 1, 2, 3 and 4, so that the candidate transmission rates may be 0.25Vmax, 0.5Vmax, 0.75Vmax and Vmax.

In a way 2, the transmission device performs communication negotiation with an opposite device for data transmission, determines a minimum transmission rate Vmin according to a result of negotiation, and selects the Vmax, the Vmin and $$\frac{V\max + V\min}{2}$$

as candidate transmission rates. If it is assumed that the value of the Vmin is determined to be 0.5Vmax through the communication negotiation between the transmission device and the opposite device, the finally determined candidate transmission rates include 0.5Vmax, 0.75Vmax and Vmax.

In a way 3, the transmission device selects all odd numbers less than or equal to the Vmax as candidate transmission rates. For example, if it is assumed that the value of the maximum transmission rate Vmax is 100 M, the values of the candidate transmission rates may consist of 1, 3, 5, 7 . . . 99. Of course, if the value of the Vmax is not an integer, the Vmax may be rounded up/down/off before the candidate transmission rates are determined.

In a way 4, the transmission device selects all even numbers less than or equal to the Vmax as candidate transmission rates. For example, if it is assumed that the value of the maximum transmission rate Vmax is 100 M, the values of the candidate transmission rates may consist of 2, 4, 6, 8 . . . 100. Similarly, if the value of the Vmax is not an integer, the Vmax may be rounded up/down/off before the candidate transmission rates are determined.

In this embodiment, the maximum transmission rate currently allowed for the transmission device may be a maximum transmission rate negotiated through the communication negotiation between the transmission device and the opposite device of transmission, or may be a maximum transmission rate specified by the user. Therefore, in this embodiment, before determining at least two candidate transmission rates based on the maximum transmission rate, the transmission device can determine the maximum transmission rate in any one of the following ways.

In a scheme 1, the transmission device performs communication negotiation with the opposite device for data transmission, and determines the maximum transmission rate according to a result of negotiation.

In a scheme 2, the transmission device detects second input information of the user, and determines the maximum transmission rate specified by the user according to the second input information. It should be understood that, the maximum transmission rate is a transmission rate that cannot be exceeded by the transmission device as required by the user, and belongs to the user's personalized requirements. However, the maximum transmission rate determined in the first scheme is the maximum transmission rate of the transmission device that is objectively supported by the communication network. Therefore, the maximum transmission rate specified by the user using the second input information cannot exceed the maximum communicate rate currently negotiated between the transmission device and the opposite device of communication. In this case, after the user specifies the maximum transmission rate to the transmission device by using the second input information, the transmission device may determine whether the maximum transmission rate exceeds the negotiated maximum transmission rate. If the maximum transmission rate exceeds the negotiated maximum transmission rate, the transmission device should prompt the user to re-input until the maximum transmission rate input by the user is less than or equal to the negotiated maximum transmission rate.

It can be seen that, in the second scheme, the user may need to specify the maximum transmission rate for several times, so that the user experience is low. Therefore, in this case, this embodiment further provides a scheme for specifying the maximum transmission rate.

In a scheme 3: the transmission device performs communication negotiation with the opposite device for data transmission, and gives an output prompt by using a result of negotiation. The user may determine, according to the output prompt, the maximum transmission rate currently objectively allowed for the transmission device, and then specify the desired maximum transmission rate based on the objective maximum transmission rate. For example, the user inputs third input information to the transmission device according to the output prompt information, and the third input information includes the maximum transmission rate specified by the user based on the output prompt of the transmission device, so that the transmission device determines the maximum transmission rate according to the third input information.

At S104, data transmission is performed for a period of time at each of the candidate transmission rates.

No matter how the transmission device determines the candidate transmission rates, after the determination of the candidate transmission rates, the transmission device may perform data transmission for a period of time at each candidate transmission rate. For example, if the candidate transmission rates determined by the transmission device include b1, b2 and b3, the transmission device performs data transmission for a period of time t1 at the candidate transmission rate b1, performs data transmission for a period of time t2 at the candidate transmission rate b2, and performs data transmission for a period of time t3 at the candidate transmission b3, respectively.

It should be understood that the data transmissions for periods t1, t2 and t3 are "experimental" transmissions at the candidate transmission rates of b1, b2 and b3, mainly to determine the energy utilization rate η of battery power of the transmission device at each transmission rate through the experimental transmission. Therefore, the data transmission of the transmission device is yet not completed at the end of the three experimental data transmission stages. A large amount of data may be transmitted after an appropriate target transmission rate is determined. That is, during the experimental data transmission at each candidate transmission rate, the transmitted data should only be a part of or even a very small part of the data to be transmitted.

In this embodiment, the duration of the data transmission at each candidate transmission rate may not be identical or may be identical. For example, in an example of this embodiment, the transmission device will perform data transmission for a period of time t at each candidate transmission rate.

At S106, the energy utilization rate of battery power during the data transmission at each of the candidate transmission rates is determined.

It should be understood that, when the transmission device determines the energy utilization rate of battery power during the data transmission at each candidate transmission rate, it is unnecessary to calculate the energy utilization rate corresponding to each candidate transmission rate, as long as the sequence of the energy utilization rate corresponding to each candidate transmission rate is determined. For example, in some examples of this embodiment, when the transmission device performs experimental data transmission at each candidate transmission rate, a same amount of data may be transmitted at each candidate transmission rate. If the battery power consumed by the data transmission corresponding to the candidate transmission rate is higher, the corresponding energy utilization rate is lower. On the contrary, if the battery power consumed by the data transmission corresponding to the candidate transmission rate is lower, the corresponding energy utilization rate is higher.

Of course, it is also feasible for the transmission device to directly calculate the corresponding energy utilization rate. After the transmission device performs data transmission at a certain candidate transmission rate, the amount of data $Q$ transmitted at this candidate transmission rate and the battery power $E$ consumed during the data transmission at this candidate transmission rate may be determined, and the energy utilization rate corresponding to this candidate transmission rate is then determined according to the amount of data $Q$ and the battery power $E$. In this embodiment, the energy utilization rate $\eta$ of the battery power may be calculated by the following formula:

$$\eta_k = \frac{Q_k}{E_k}$$

where $\eta_k$ represents the corresponding energy utilization rate during the data transmission at the $k^{th}$ candidate transmission rate $V_k$; $k$ is a positive integer; $Q_k$ represents the amount of data transmitted during the data transmission at $k^{th}$ candidate transmission rate $V_k$; and, $E_k$ represents the battery power consumed during the data transmission at $k^{th}$ candidate transmission rate $V_k$.

In an example of this embodiment, during the experimental data transmission at a certain candidate transmission rate $V_k$, the transmission device may record all the battery power $E$ consumed by data transmission in the experimental transmission stage at this candidate transmission rate $V_k$. At the end of the data transmission in this experimental transmission stage, the amount of the transmitted data in this experimental transmission stage is calculated, and the energy utilization rate $\eta_k$ in this experimental transmission stage is calculated according to the above formula.

The $Q_k$ may be calculated by the following formula:

$$Q_k = V_k \cdot t_k$$

where $t_k$ is the duration of the data transmission at the $k^{th}$ candidate transmission rate $V_k$.

The $E_k$ may be determined in any one of the following two ways.

In a way 1, the transmission device counts the remaining battery power $E_{k1}$ at the beginning of the experimental data transmission at the candidate transmission rate $V_k$ and the remaining battery power $E_{k2}$ at the end of the experimental data transmission at the candidate transmission rate $V_k$, so that the difference between $E_{k1}$ and $E_{k2}$ is calculated as $E_k$. Of course, this scheme is more suitable for transmission devices powered by batteries. This is because, in this case, the battery of the transmission device has the so-called "remaining battery power". In a case where the transmission device is powered by an external power supply via an adapter or powered by both an external power supply and the battery of the transmission device, the scheme for determining the $E_k$ may not be very suitable. In this case, another scheme for determining the $E_k$ will be provided below.

In a way 2, the transmission device calculates the $E_k$ by the following formula:

$$E_k = \int_0^{t_k} U \cdot I(t) dt$$

where U is the operating voltage of the transmission device system, and I(t) is the instantaneous current at the moment t. This scheme for determining the $E_k$ is suitable for not only a scenario where the transmission device is powered by an external power supply, but also a transmission scenario where the transmission device is powered by only the battery inside the transmission device.

In the foregoing description, the determination of the energy utilization rate during the data transmission at the $k^{th}$ candidate transmission rate by the transmission device has been introduced. It should be understood that, for each candidate transmission rate, the transmission device will determine the corresponding energy utilization rate by using the above scheme.

At S108, a target transmission rate for subsequent data transmission is selected from the candidate transmission rates according to the energy utilization rate.

After the energy utilization rate corresponding to each candidate transmission rate is determined, the transmission device may select, according to the energy utilization rate corresponding to each candidate transmission rate, one of the candidate transmission rates as a target transmission rate, and performs data transmission at this target transmission rate in the subsequent process. In some examples of this embodiment, the transmission device may transmit all data in the subsequent data transmission process, that is, the data transmitted in the experimental data transmission stage may be transmitted once again in the subsequent process. It is also possible to merely transmit the remaining data after the experimental data transmission. This scheme for merely transmitting the remaining data can decrease the amount of data transmitted and reduce the power consumption of the whole data transmission.

It should be understood that the transmission device may directly select the candidate transmission rate corresponding to the highest energy utilization rate as a target transmission rate. In this way, the transmission device can transmit more data in the case of consuming the same battery power. Undoubtedly, if the candidate transmission rate corresponding to the highest energy utilization rate is selected as a target transmission rate, compared with the selection of another candidate transmission rate as a target transmission rate, the energy utilization rate must be highest, and the power consumption caused by data transmission should be lowest when the amount of data to be transmitted is definite. However, in this case, the data transmission rate may be low. Therefore, if the data to be transmitted currently is data that is required in transmission rate, during the selection of the target transmission rate, the transmission device will not only separately consider the energy utilization rate corresponding to each candidate transmission rate, but also comprehensively consider the candidate transmission rate itself. For example, a candidate transmission rate having a better transmission rate value and a better energy utilization rate value is selected as a target transmission rate.

For example, through the determination by the transmission device, the energy utilization rates corresponding to the three candidate transmission rates $V_1$, $V_2$ and $V_3$ are $\eta_1$, $\eta_2$ and $\eta_3$, respectively; the relationship among the three candidate transmission rates is $V_1 > V_2 > V_3$; and the relationship among the three energy utilization rates is $\eta_1 < \eta_2 < \eta_3$. To consider both the transmission rate and the transmission power consumption, the transmission device may select the candidate transmission rate $V_2$ as a target transmission rate.

Except that the requirements of the data to be transmitted for the transmission rate are taken into consideration during the selection of the target transmission rate from the candidate transmission rates, in other schemes provided in this embodiment, the transmission device may firstly determine whether the data to be transmitted has higher requirements for the transmission rate or the power consumption. That is, the transmission device firstly determines whether the data transmission is performed in a "power-saving-first mode" which preferentially guarantees low power consumption or in a "speed-first mode" which preferentially guarantees high speed.

The user can specify, to the transmission device, whether to adopt the "power-saving-first mode" or the "speed-first mode" during data transmission. For example, whether to preferentially consider the power saving or data transmission speed is specified by inputting first information to the transmission device. Upon detecting the first information, the transmission device judges whether to determine a target transmission rate that contributes to reducing the power consumption of data transmission. If the result of judgment is YES, the transmission device will execute S102 again; or otherwise, the target transmission rate may be directly determined according to other schemes.

It should be understood that, in the above example, the user determines whether to adopt the "power-saving-first mode" or the "speed-first mode" during data transmission. However, in some examples of this embodiment, the transmission device may determine to adopt which mode by itself. For example, the transmission device may determine whether this device is powered by an external power supply currently. If this device is powered by an external power supply currently, it is indicated that the power consumption will not be taken into consideration currently, so that the maximum transmission rate currently allowed for this device may be directly used as a target transmission rate for data transmission. However, if the transmission device determines that this device is not powered by an external power supply currently, to save the power consumed by data transmission, at least two candidate transmission rates may be first determined, and a target transmission rate is then selected based on the energy utilization rate corresponding to each candidate transmission rate.

In the method for determining transmission rate provided in this embodiment, the transmission device abandons the practice of transmitting data directly at the currently allowed maximum transmission rate. In a data transmission scenario having low requirements on the transmission rate but strict requirements on the transmission power consumption, before determining a target transmission rate for data transmission, the transmission device will determine at least two candidate transmission rates and then select a candidate transmission rate with a higher energy utilization rate from the candidate transmission rates as a target transmission rate based on the energy utilization rate at each candidate transmission rate. Accordingly, the power consumption caused by the data transmission is reduced, and the battery life of the transmission device is prolonged.

Embodiment Two

To make the advantages and details of the method for determining transmission rate clearer to those skilled in the art, the method for determining transmission rate in the previous embodiment will be further explained in this embodiment by specific examples.

Figure 2:
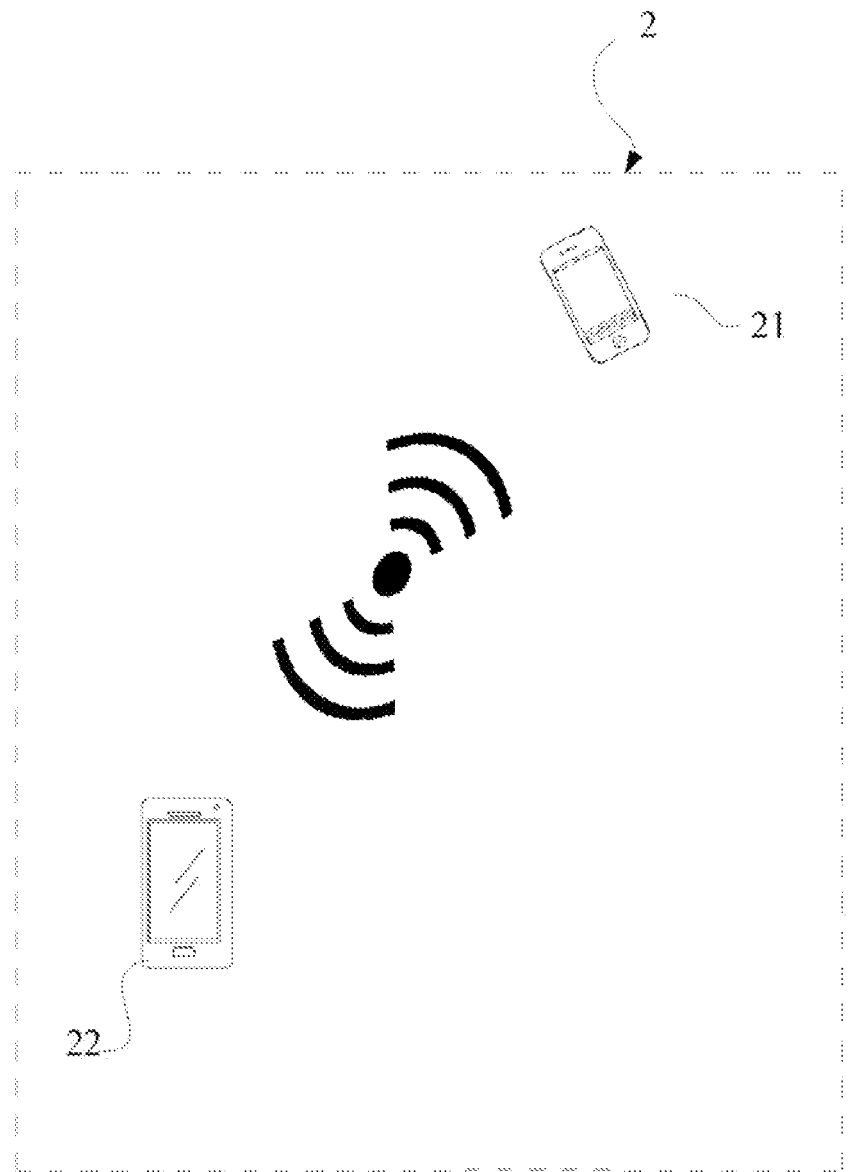
FIG. 2 is a structural diagram of a transmission system according to Embodiment one of the present disclosure.

FIG. 2 shows a structural diagram of a data transmission system. The data transmission system 2 includes a first transmission device 21 and a second transmission device 22. The first transmission device 21 and the second transmission device 22 may be communicatively connected in a wired or wireless manner. In FIG. 2, since the first transmission device 21 and the second transmission device 22 are relatively close, they may be directly connected in a short-distance communication manner such as Bluetooth or Zigbee.

Figure 3:
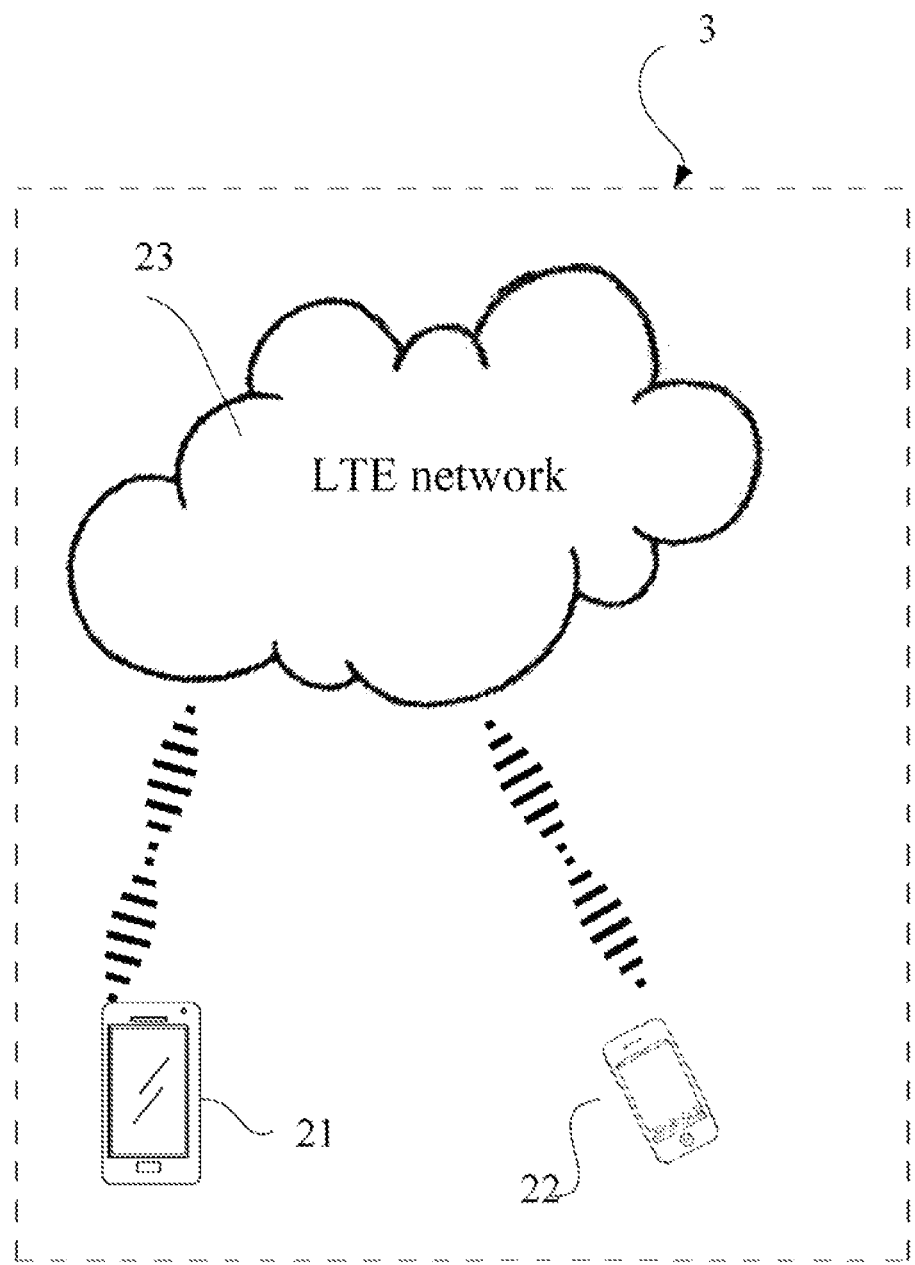
FIG. 3 is another structural diagram of the transmission system according to Embodiment one of the present disclosure.

In some examples, the data transmission system 2 may further include a gateway device or the like. The first transmission device 21 and the second transmission 22 may be communicatively connected on the basis of a wireless local area network (e.g., a WiFi network) established by the gateway device, as shown in FIG. 3. In other data transmission systems 2 of this embodiment, the first transmission device 21 and the second transmission device 22 may be connected on the basis of an long term evolution (LTE) network 23 (or a mobile communication network such as a 3rd-generation (3G) network or a 5th-generation (5G) network).

In some examples of this embodiment, one of the first transmission device 21 and the second transmission device 22 may be a mobile terminal, such as a mobile phone, a tablet computer, a notebook computer, a palmtop computer, a personal digital assistant (PDA), a portable media player (PMP), a navigation device, a wearable device, a smart bracelet or a pedometer. It should be understood that, in addition to the mobile terminal, the first transmission device 21 or the second transmission device 22 may be a fixed terminal such as a digital TV set or a desk computer, or may be an IoT device such as a shared bicycle, an intelligent water meter, an intelligent electric meter or an electronic visual doorbell. In addition to the terminal device, the first transmission device 21 or the second transmission device 22 may be a device with a data transmission function, such as a base station, a gateway or a server.

The following description will be given by taking the first transmission device being an electronic visual doorbell and the second transmission device being a computer communicated with the electronic visual doorbell via Bluetooth as an example.

The electronic visual doorbell integrates the functions of a peep hole and a doorbell, and can replace the conventional optical visual doorbells. The electronic visual doorbell has monitoring and recording functions. The electronic visual doorbell can capture images by a camera and then store the captured image data. However, the electronic visual doorbell usually has a small storage space. Therefore, to store new image data, it may be necessary to delete the previously recorded and stored image data or transfer the image data to other storage devices. When the electronic visual doorbell is applied in the home, the electronic visual doorbell may be connected to a computer in the home (e.g., a desk computer or a notebook computer in the home) via Bluetooth. Thus, when the electronic visual doorbell needs to vacate the storage space, the stored image data is moved to the computer for storage.

Figure 4:
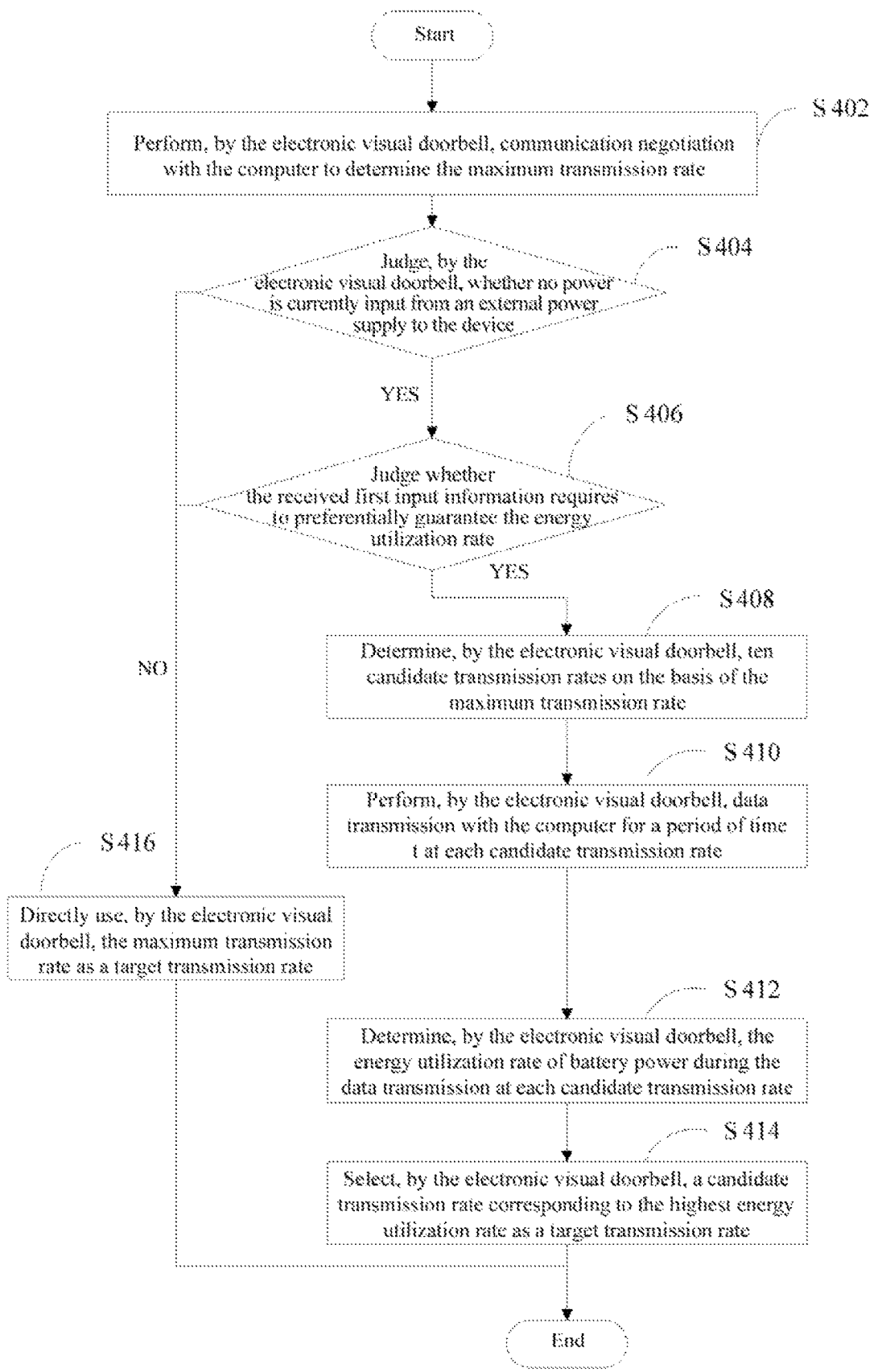
FIG. 4 is a flowchart of a method for determining transmission rate according to Embodiment two of the present disclosure.

In this embodiment, the electronic visual doorbell is powered by a storage battery. However, it should be understood that, in other examples of this embodiment, the electronic visual doorbell may be powered by an external power supply, for example, being connected to a mains supply via a power adapter. The process of executing the method for determining transmission rate by the electronic visual doorbell will be described below with reference to the flowchart in FIG. 4.

At S402, the electronic visual doorbell performs communication negotiation with the computer to determine the maximum transmission rate.

In this embodiment, the maximum transmission rate determined by the electronic visual doorbell refers to the maximum transmission rate determined by the electronic visual doorbell in communication negotiation with the computer according to the current communication condition. However, it should be understood that, in other examples of this embodiment, the maximum transmission rate may also be a maximum transmission rate specified by the user on the basis of the negotiated maximum transmission rate.

At S404, the electronic visual doorbell judges whether no power is currently input from an external power supply to the device.

If the result of judgment is YES, the electronic visual doorbell will execute S406; or otherwise, the electronic visual doorbell will execute S416.

It should be understood that, when the electronic visual doorbell determines that it is powered by the external power supply currently, it is indicated that the battery power consumed by data transmission will not be taken into consideration currently, so that the data to be transmitted may be transmitted to the computer as soon as possible at a high transmission rate. However, if the electronic visual doorbell determines that it is not powered by the external power supply currently, the power consumption caused by data transmission may be taken into consideration, so that the process proceeds to S406.

At S406, the electronic visual doorbell judges whether the received first input information requires to preferentially guarantee the energy utilization rate.

If the result of judgment is YES, S408 will be executed; or otherwise, S416 will be executed. In some examples of this embodiment, when the electronic visual doorbell determines that no external power supply supplies power currently, the electronic visual doorbell may further determine whether the user requires to preferentially guarantee the energy utilization rate. Only when the result of judgment is also YES, the electronic visual doorbell judges that the data transmission is to be completed with a lower power consumption currently. Otherwise, for example, if the user specifies to preferentially guarantee the transmission rate, the electronic visual doorbell may directly use the determined maximum transmission rate as a target transmission rate for transmitting data to the computer.

Figure 5:
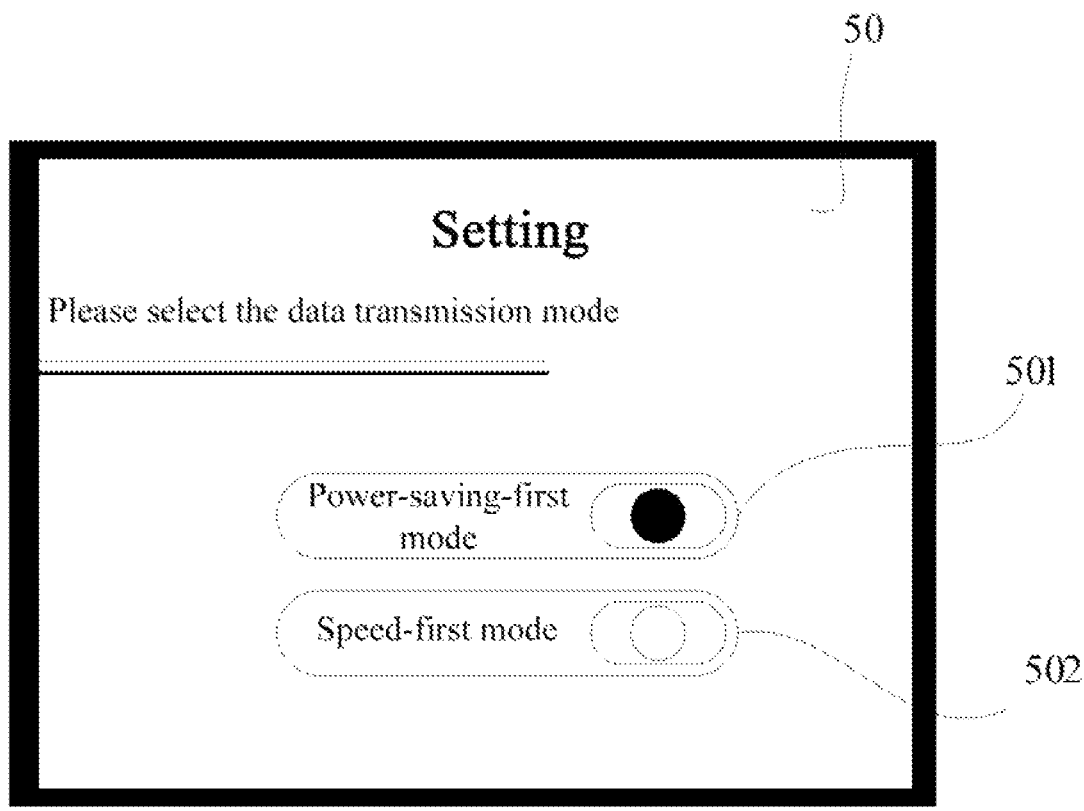
FIG. 5 is a diagram of a user interface of an electronic visual doorbell according to Embodiment two of the present disclosure.

It should be understood that, since the amount of data to be moved is definite in a certain process of moving the stored image data by the electronic visual doorbell, if the user specifies to preferentially guarantee the energy utilization rate, it is indicated that the user requires to transmit the data with the lower power consumption, so that the user actually requires to save power as far as possible during the data transmission. However, if the user specifies to preferentially guarantee the data transmission rate, the user may specify the speed-first mode to the electronic visual doorbell. As shown in FIG. 5, FIG. 5 shows a user interface of the electronic visual doorbell. The interface 50 includes a power-saving-first control 501 and a speed-first control 502. By touching one of the two functional controls, the user can specify, to the electronic visual doorbell, the principle to be followed by the data transmission. When the user touches the power-saving-first control 501, the electronic visual doorbell will detect first input information. The first input information includes information indicating that the user specifies to preferentially guarantee the energy utilization rate.

At S408, the electronic visual doorbell determines ten candidate transmission rates on the basis of the maximum transmission rate.

In this embodiment, the electronic visual doorbell will determine candidate transmission rates in Way 1 described in Embodiment one. That is, the electronic visual doorbell selects $$\frac{k}{N} V\max$$

as candidate transmission rates. It should be understood that, in this scheme, the candidate transmission rates form an arithmetic sequence having a common difference of $$\frac{1}{N} V\max.$$

Since the N is 10, in this embodiment, the common difference between each of the candidate transmission rates is $$\frac{1}{10} V\max.$$

Thus, the first candidate transmission rate is $$\frac{1}{10} V\max,$$

the second candidate transmission rate is $$\frac{1}{5} V\max,$$

the third candidate transmission rate is $$\frac{3}{10} V\max \ldots$$

the last candidate transmission rate is Vmax.

It should be understood that, during the determination of candidate transmission rates in Way 1, if the value of the N is larger, there are more candidate transmission rates, and the values of the candidate transmission rates are uniformly distributed from 0 to Vmax, so that the energy utilization rate corresponding to each candidate transmission rate is regarded as an energy utilization rate corresponding to a transmission rate from $$\frac{k-1}{N} V\max$$

to $$\frac{k}{N} V\max.$$

Therefore, when the N is larger, the interval of transmission rates corresponding to one energy utilization rate is smaller, and the granularity of the energy utilization rate is smaller. In this way, during the determination of the target transmission rate according to the energy utilization rate corresponding to each candidate transmission rate, the selected target transmission rate is more accurate.

At S410, the electronic visual doorbell performs data transmission with the computer for a period of time t at each candidate transmission rate.

In this embodiment, when the electronic visual doorbell performs experimental data transmission at each of the ten candidate transmission rates, the duration of the data transmission at each candidate transmission rate is the same, i.e., being t. When the electronic visual doorbell performs data transmission at a certain candidate transmission rate, the electronic visual doorbell may record the instantaneous current at each moment, so as to subsequently calculate the battery power consumed during the data transmission at this candidate transmission rate.

At S412, the electronic visual doorbell determines the energy utilization rate of battery power during the data transmission at each candidate transmission rate.

For the $k^{th}$ candidate transmission rate (where k is greater than 0 but less than or equal to 10), the electronic visual doorbell may calculate, according to the recorded instantaneous current at each moment during the data transmission at this candidate transmission rate, the total battery power consumed during the data transmission at this candidate transmission rate; and, in accordance with the following formula:

$$\eta_k = \frac{Q_k}{E_k}$$

the energy utilization rate corresponding to this candidate transmission rate is calculated.

In other examples of this embodiment, the electronic visual doorbell may transmit the data with a same amount of data Q at each candidate transmission rate, and then calculate the battery power consumed by transmitting the data at each candidate transmission rate. In this case, the electronic visual doorbell can directly determine the highest energy utilization rate corresponding to the candidate transmission rate having the lowest power consumption, without calculating the specific value of the energy utilization rate.

At S414, the electronic visual doorbell selects a candidate transmission rate corresponding to the highest energy utilization rate as a target transmission rate.

After the energy utilization rate corresponding to each candidate transmission rate is determined, the electronic visual doorbell may directly select a candidate transmission rate corresponding to the highest energy utilization rate as a target transmission rate, because it can be determined from the judgment in the steps S404 and S406 that the power consumption may be mainly taken into consideration during the current data transmission of the electronic visual doorbell.

At S416, the electronic visual doorbell directly uses the maximum transmission rate as a target transmission rate.

If the electronic visual doorbell determines that it is powered by an external power supply currently or that the user does not require to preferentially save power, the data transmission from the electronic visual doorbell to the computer may be preferential in the transmission rate. Therefore, the maximum transmission rate may be directly selected as a target transmission rate.

It should be understood that, after the target transmission rate is determined, the electronic visual doorbell may transmit image data to the computer at the target transmission rate and locally delete the image data that has been transmitted to the computer, so as to vacate the storage space for new data.

In the method for determining transmission rate provided in this embodiment, the electronic visual doorbell may determine, according to the current power supply condition and the user's instruction, whether the power consumption or the speed should be taken into consideration during the data transmission; and, when it is determined that the power consumption of the data transmission is taken into consideration, a higher energy utilization rate is determined according to the energy utilization rates at a plurality of candidate transmission rates, and the candidate transmission rate corresponding to this energy utilization rate is used as a target transmission rate. Accordingly, it is ensured that the data transmission can be completed with less power consumption, the battery power of the electronic visual doorbell can be saved, the battery life of the electronic visual doorbell can be prolonged, and the user experience can be improved.

Embodiment Three

Figure 6:
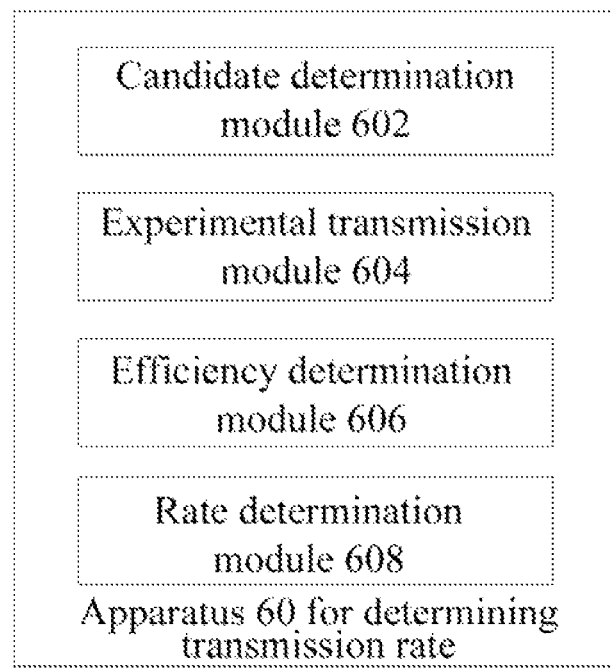
FIG. 6 is a structural diagram of an apparatus for determining transmission rate according to Embodiment three of the present disclosure.

This embodiment provides an apparatus for determining transmission rate, as shown in FIG. 6.

The apparatus 60 for determining transmission rate includes a candidate determination module 602, an experimental transmission module 604, an efficiency determination module 606 and a rate determination module 608, wherein the candidate determination module 602 is configured to determine at least two candidate transmission rates; the experimental transmission module 604 is configured to perform data transmission for a period of time at each of the candidate transmission rates; the efficiency determination module 606 is configured to determine an energy utilization rate of battery power during the data transmission at each of the candidate transmission rates; and the rate determination module 608 is configured to select a target transmission rate for subsequent data transmission from the candidate transmission rates according to the energy utilization rate.

The candidate transmission rate is a basis for determining the target transmission rate. In this embodiment, the target transmission rate is determined based on at least two candidate transmission rates. The candidate transmission rate may be randomly determined by the candidate determination module 602, or may be determined based on one or some established principles. For example, in an example of this embodiment, the candidate determination module 602 may select at least two of the transmission rates used recently by the transmission device as candidate transmission rates, that is, the candidate determination module 602 determines at least two candidate transmission rates on the basis of the historical transmission rates of the transmission device. If it is assumed that the transmission device used the transmission rates a1, a2, a3 and a4 to transmit data with an opposite device in the last week, during the determination of the transmission rate, the candidate determination module 602 may select at least two of a1, a2, a3 and a4. It is assumed that three of a1, a2, a3 and a4 are used as candidate transmission rates here.

In other examples of this embodiment, the candidate determination module 602 may determine the candidate transmission rates on the basis of the maximum transmission rate Vmax currently allowed for the transmission device. It should be understood that the value of each candidate transmission rate determined on the basis of the maximum transmission rate Vmax will not exceed the maximum transmission rate Vmax. The scheme for determining, by the candidate determination module 602, candidate transmission rates according to the maximum transmission rate Vmax will be described below.

In a way 1, the candidate determination module 602 selects $$\frac{a}{N} V\max$$

as the candidate transmission rate, where N is any positive integer, and the value of a consist of each of positive integers less than or equal to N. For example, if it is assumed that N is 10, the a has 10 values, i.e., positive integers from 1 to 10. If it is assumed that N is 4, the values of a consist of 1, 2, 3 and 4, so that the candidate transmission rates may be 0.25Vmax, 0.5Vmax, 0.75Vmax and Vmax.

In a way 2, the candidate determination module 602 performs communication negotiation with an opposite device for data transmission, determines a minimum transmission rate Vmin according to the result of negotiation, and selects the Vmax, the Vmin and $$\frac{V\max + V\min}{2}$$

as candidate transmission rates. If it is assumed that the value of the Vmin is determined to be 0.5Vmax through the communication negotiation between the candidate determination module 602 and the opposite device, the finally determined candidate transmission rates include 0.5Vmax, 0.75Vmax and Vmax.

In a way 3, the candidate determination module 602 selects all odd numbers less than or equal to the Vmax as candidate transmission rates. For example, if it is assumed that the value of the maximum transmission rate Vmax is 100 M, the values of the candidate transmission rates may consist of 1, 3, 5, 7 . . . 99. Of course, if the value of the Vmax is not an integer, the Vmax may be rounded up/down/off before the candidate transmission rates are determined.

In a way 4, the candidate determination module 602 selects all even numbers less than or equal to the Vmax as candidate transmission rates. For example, if it is assumed that the value of the maximum transmission rate Vmax is 100 M, the values of the candidate transmission rates may consist of 2, 4, 6, 8 . . . 100. Similarly, if the value of the Vmax is not an integer, the Vmax may be rounded up/down/off before the candidate transmission rates are determined.

In this embodiment, the maximum transmission rate currently allowed for the candidate determination module 602 may be a maximum transmission rate negotiated through the communication negotiation between the candidate determination module 602 and the opposite device of transmission, or may be a maximum transmission rate specified by the user. Therefore, in this embodiment, before determining at least two candidate transmission rates based on the maximum transmission rate, the candidate determination module 602 can determine the maximum transmission rate in any one of the following ways.

In a scheme 1, the candidate determination module 602 performs communication negotiation with the opposite device for data transmission, and determines the maximum transmission rate according to a result of negotiation.

In a scheme 2, the candidate determination module 602 detects second input information of the user, and determines the maximum transmission rate specified by the user according to the second input information. It should be understood that, the maximum transmission rate is a transmission rate that cannot be exceeded by the transmission device as required by the user, and belongs to the user's personalized requirements. However, the maximum transmission rate determined in the first scheme is the maximum transmission rate of the transmission device that is objectively supported by the communication network. Therefore, the maximum transmission rate specified by the user using the second input information cannot exceed the maximum communicate rate currently negotiated between the candidate determination module 602 and the opposite device of communication. In this case, after the user specifies the maximum transmission rate to the apparatus 60 for determining transmission rate by using the second input information, the candidate determination module 602 can determine whether the maximum transmission rate exceeds the negotiated maximum transmission rate. If the maximum transmission rate exceeds the negotiated maximum transmission rate, the candidate determination module 602 should prompt the user to re-input until the maximum transmission rate input by the user is less than or equal to the negotiated maximum transmission rate.

It can be seen that, in the second scheme, the user may need to specify the maximum transmission rate for several times, so that the user experience is low. Therefore, in this case, this embodiment further provides a scheme for specifying the maximum transmission rate.

In a scheme 3: the candidate determination module 602 performs communication negotiation with the opposite device for data transmission, and gives an output prompt by using a result of negotiation. The user may determine, according to the output prompt, the maximum transmission rate currently objectively allowed for the transmission device, and then specify the desired maximum transmission rate based on the objective maximum transmission rate. For example, the user inputs third input information to the candidate determination module 602 according to the output prompt information, and the third input information includes the maximum transmission rate specified by the user based on the output prompt of the candidate determination module 602, so that the candidate determination module 602 determines the maximum transmission rate according to the third input information.

No matter how the candidate determination module 602 determines the candidate transmission rates, after the determination of the candidate transmission rates, the experimental transmission module 604 can perform data transmission for a period of time at each candidate transmission rate. For example, if the candidate transmission rates determined by the candidate determination module 602 include b1, b2 and b3, the experimental transmission module 604 performs data transmission for a period of time t1 at the candidate transmission rate b1, performs data transmission for a period of time t2 at the candidate transmission rate b2, and performs data transmission for a period of time t3 at the candidate transmission b3, respectively.

It should be understood that the data transmissions for periods t1, t2 and t3 are "experimental" transmissions at the candidate transmission rates of b1, b2 and b3, mainly to determine the energy utilization rate η of battery power of the transmission device at each transmission rate through the experimental transmission. Therefore, the data transmission of the transmission device is yet not completed at the end of the three experimental data transmission stages. A large amount of data may be transmitted after an appropriate target transmission rate is determined. That is, during the experimental data transmission at each candidate transmission rate, the transmitted data should only be a part of or even a very small part of the data to be transmitted.

In this embodiment, the duration of the data transmission at each candidate transmission rate may not be identical or may be identical. For example, in an example of this embodiment, the experimental transmission module 604 will perform data transmission for a period of time t at each candidate transmission rate.

It should be understood that, when the efficiency determination module 606 determines the energy utilization rate of battery power during the data transmission at each candidate transmission rate, it is unnecessary to calculate the energy utilization rate corresponding to each candidate transmission rate, as long as the sequence of the energy utilization rate corresponding to each candidate transmission rate is determined. For example, in some examples of this embodiment, when the transmission device performs experimental data transmission at each candidate transmission rate, the efficiency determination module 606 may transmit a same amount of data at each candidate transmission rate. If the battery power consumed by the data transmission corresponding to the candidate transmission rate is higher, the corresponding energy utilization rate is lower. On the contrary, if the battery power consumed by the data transmission corresponding to the candidate transmission rate is lower, the corresponding energy utilization rate is higher.

Of course, it is also feasible for the efficiency determination module 606 to directly calculate the corresponding energy utilization rate. After the transmission device performs data transmission at a certain candidate transmission rate, the efficiency determination module 606 may determine the amount of data Q transmitted at this candidate transmission rate and the battery power E consumed during the data transmission at this candidate transmission rate, and the efficiency determination module 606 determines the energy utilization rate corresponding to this candidate transmission rate according to the amount of data Q and the battery power E. In this embodiment, the energy utilization rate η of the battery power may be calculated by the following formula:

$$\eta_k = \frac{Q_k}{E_k}$$

where $\eta_k$ represents the corresponding energy utilization rate during the data transmission at the $k^{th}$ candidate transmission rate $V_k$; k is a positive integer; $Q_k$ represents the amount of data transmitted during the data transmission at $k^{th}$ candidate transmission rate $V_k$; and, $E_k$ represents the battery power consumed during the data transmission at $k^{th}$ candidate transmission rate $V_k$.

In an example of this embodiment, when the experimental transmission module 604 controls the transmission device to perform experimental data transmission at a certain candidate transmission rate $V_k$, the efficiency determination module 606 may record all the battery power E consumed by data transmission in the experimental transmission stage at this candidate transmission rate $V_k$. At the end of the data transmission in this experimental transmission stage, the efficiency determination module 606 calculates the amount of the transmitted data in this experimental transmission stage, and then calculates the energy utilization rate $\eta_k$ in this experimental transmission stage according to the above formula.

The $Q_k$ may be calculated by the following formula:

$$Q_k = V_k \cdot t_k$$

where $t_k$ is the duration of the data transmission at the $k^{th}$ candidate transmission rate $V_k$.

The $E_k$ may be determined in any one of the following two ways.

In a way 1, the efficiency determination module 606 counts the remaining battery power $E_{k1}$ at the beginning of the experimental data transmission at the candidate transmission rate $V_k$ and the remaining battery power $E_{k2}$ at the end of the experimental data transmission at the candidate transmission rate $V_k$, so that the difference between $E_{k1}$ and $E_{k2}$ is calculated as $E_k$. Of course, this scheme is more suitable for transmission devices powered by batteries. This is because, in this case, the battery of the transmission device has the so-called "remaining battery power". In a case where the transmission device is powered by an external power supply via an adapter or powered by both an external power supply and the battery of the transmission device, the scheme for determining the $E_k$ may not be very suitable. In this case, another scheme for determining the $E_k$ will be provided below.

In a way 2, the efficiency determination module 606 calculates the $E_k$ by the following formula:

$$E_k = \int_0^{t_k} U \cdot I(t) dt$$

where U is the operating voltage of the transmission device system, and I(t) is the instantaneous current at the moment t. This scheme for determining the $E_k$ is suitable for not only a scenario where the transmission device is powered by an external power supply, but also a transmission scenario where the transmission device is powered by only the battery inside the transmission device.

In the foregoing description, the determination of the energy utilization rate during the data transmission at the $k^{th}$ candidate transmission rate by the efficiency determination module 606 has been introduced. It should be understood that, for each candidate transmission rate, the efficiency determination module 606 will determine the corresponding energy utilization rate by using the above scheme.

After the efficiency determination module 606 determines the energy utilization rate corresponding to each candidate transmission rate, the rate determination module 608 may select, according to the energy utilization rate corresponding to each candidate transmission rate, one of the candidate transmission rates as a target transmission rate, and performs data transmission at this target transmission rate in the subsequent process. In some examples of this embodiment, the transmission device may transmit all data in the subsequent data transmission process, that is, the data transmitted in the experimental data transmission stage may be transmitted once again in the subsequent process. It is also possible to merely transmit the remaining data after the experimental data transmission. This scheme for merely transmitting the remaining data can decrease the amount of data transmitted and reduce the power consumption of the whole data transmission.

It should be understood that the rate determination module 608 may directly select the candidate transmission rate corresponding to the highest energy utilization rate as a target transmission rate. In this way, the transmission device can transmit more data in the case of consuming the same battery power. Undoubtedly, if the candidate transmission rate corresponding to the highest energy utilization rate is selected as a target transmission rate, compared with the selection of another candidate transmission rate as a target transmission rate, the energy utilization rate must be highest, and the power consumption caused by data transmission should be lowest when the amount of data to be transmitted is definite. However, in this case, the data transmission rate may be low. Therefore, if the data to be transmitted currently is data that is required in transmission rate, during the selection of the target transmission rate, the rate determination module 608 will not only separately consider the energy utilization rate corresponding to each candidate transmission rate, but also comprehensively consider the candidate transmission rate itself. For example, a candidate transmission rate having a better transmission rate value and a better energy utilization rate value is selected as a target transmission rate.

For example, through the determination by the efficiency determination module 606, the energy utilization rates corresponding to the three candidate transmission rates $V_1$, $V_2$ and $V_3$ are $\eta_1$, $\eta_2$ and $\eta_3$, respectively; the relationship among the three candidate transmission rates is $V_1 > V_2 > V_3$; and the relationship among the three energy utilization rates is $\eta_1 < \eta_2 < \eta_3$. To consider both the transmission rate and the transmission power consumption, the rate determination module 608 may select the candidate transmission rate $V_2$ as a target transmission rate.

Except that the requirements of the data to be transmitted for the transmission rate are taken into consideration during the selection of the target transmission rate from the candidate transmission rates, in other schemes provided in this embodiment, the apparatus 60 for determining transmission rate may firstly determine whether the data to be transmitted has higher requirements for the transmission rate or the power consumption.

Figure 7:
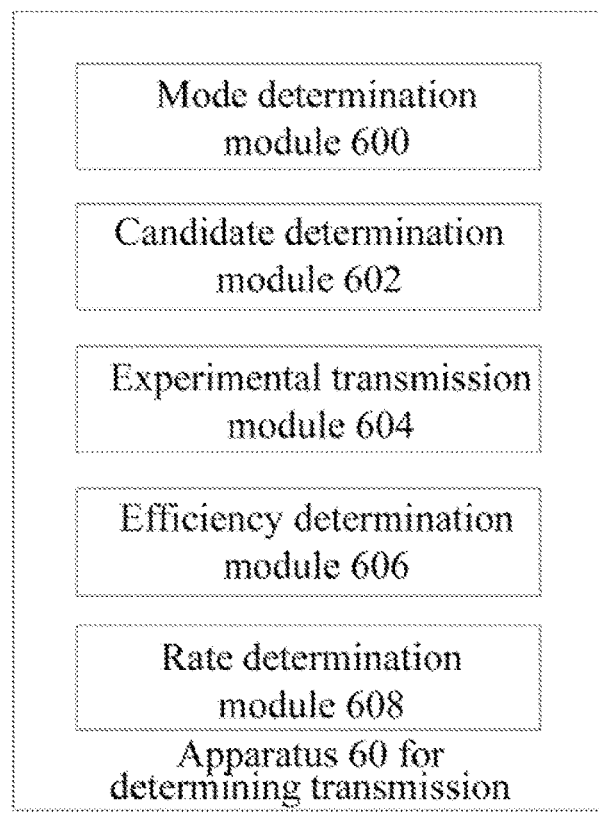
FIG. 7 is another structural diagram of the apparatus for determining transmission rate according to Embodiment three of the present disclosure.

With reference to FIG. 7, in addition to the candidate determination module 602, the experimental transmission module 604, the efficiency determination module 606 and the rate determination module 608, the apparatus 60 for determining transmission rate further includes a mode determination module 600 configured to determine whether data transmission is performed in a "power-saving" first mode or a "transmission speed" first mode before the candidate determination module 602 determines the candidate transmission rates.

The mode determination module 600 may determine, in two ways, whether the power-saving-first mode or the speed-first mode is used during data transmission.

In a way 1: the mode determination module 600 performs determination according to the user's input. The user may specify whether to preferentially consider the power saving or data transmission speed by inputting first information to the mode determination module 600. Upon detecting the first information, the mode determination module 600 judges whether to determine a target transmission rate that contributes to reducing the power consumption of data transmission. If the result of judgment is YES, the mode determination module 600 will determine candidate transmission rates again; or otherwise, the target transmission rate may be directly determined according to other schemes.

It should be understood that, in the above example, the user determines whether to determine the target transmission rate according to at least two candidate transmission rates. However, in some examples of this embodiment, the mode determination module 600 may determine to adopt the power-saving-first mode or the speed-first mode during data transmission according to the current power supply condition. For example, the mode determination module 600 may determine whether the transmission device is powered by an external power supply currently. If the transmission device is powered by an external power supply currently, it is indicated that the power consumption of the transmission device will not be taken into consideration currently, so that the maximum transmission rate currently allowed for the transmission device may be directly used as a target transmission rate for data transmission. However, if the mode determination module 600 determines that the transmission device is not powered by an external power supply currently, to save the power consumed by data transmission, the candidate determination module 602 may first determine at least two candidate transmission rates, and the rate determination module 608 selects a target transmission rate on the basis of the energy utilization rate corresponding to each candidate transmission rate.

In the apparatus for determining transmission rate provided in this embodiment, the apparatus for determining transmission rate abandons the practice of allowing the transmission device to transmit data directly at the currently allowed maximum transmission rate. In a data transmission scenario having low requirements on the transmission rate but strict requirements on the transmission power consumption, before determining a target transmission rate for data transmission, the apparatus for determining transmission rate will determine at least two candidate transmission rates and then selects a candidate transmission rate with a higher energy utilization rate from the candidate transmission rates as a target transmission rate based on the energy utilization rate at each candidate transmission rate. Accordingly, the power consumption caused by the data transmission is reduced, and the battery life of the transmission device is prolonged.

Embodiment Four

This embodiment provides a storage medium and a transmission device. The storage medium will be first described below.

The storage medium can store one or more computer programs that can be read, compiled and executed by one or more processors. In this embodiment, the storage medium can store programs for determining transmission rate that can be executed by one or more processors to implement the steps in the method for determining transmission rate described in Embodiment one or two.

Figure 8:
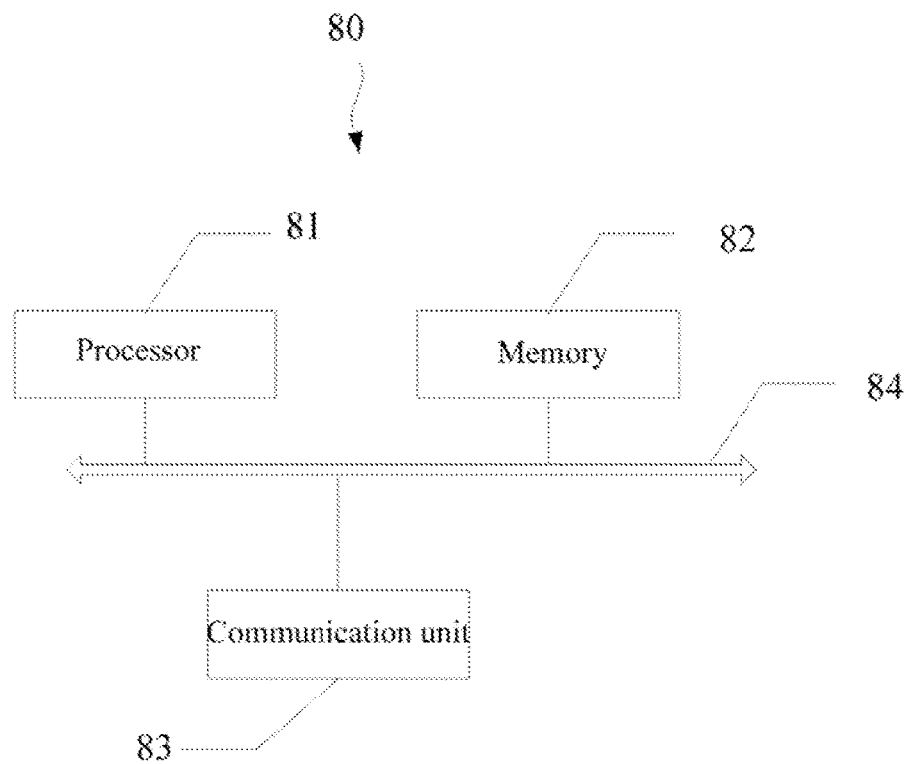
FIG. 8 is a schematic diagram of a hardware structure of a transmission device according to Embodiment four of the present disclosure.

This embodiment further provides a transmission device. FIG. 8 shows a schematic diagram of a hardware structure of the transmission device.

The transmission device 80 includes a processor 81, a memory 82, a communication unit 83 and a communication bus 41 used for connecting the processor 81 to the memory 82 and connecting the processor 81 to the communication unit 83, wherein the memory 82 may be the above-described storage medium stored with programs for determining transmission rate. The processor 81 can read, compile and execute the programs for determining transmission rate stored in the memory 82 to implement the steps in the method for determining transmission rate described in Embodiment one or two.

The processor 81 determines at least two candidate transmission rates and then controls the communication unit 83 to perform data transmission for a period of time at each of the candidate transmission rates. Subsequently, the processor 81 determines an energy utilization rate of battery power during the data transmission at each of the candidate transmission rates, and selects a target transmission rate for subsequent data transmission from the candidate transmission rates according to the energy utilization rate.

For the details of implementing the method for determining transmission rate in Embodiment one or two by the transmission device 80, reference may be made to the description in the foregoing embodiments and details will not be repeated here.

In this embodiment, the transmission device determines the target transmission rate on the basis of the energy utilization rate of the battery energy during the data transmission corresponding to each candidate transmission rate, so that the power consumption caused by the data transmission is taken into consideration on the basis of ensuring the completion of data transmission. Accordingly, it is advantageous to reduce the power consumption of the data transmission, save the battery power of the transmission device, prolong the battery life of the device and improve the user experience.

The present disclosure has the following beneficial effects.

In accordance with the method for determining transmission rate, the apparatus, the transmission device and the storage medium provided by the embodiments of the present disclosure, the transmission device determines at least two candidate transmission rates, then performs data transmission for a period of time at each of the candidate transmission rates, determines the energy utilization rate of battery power during the data transmission at each of the candidate transmission rates, and selects a target transmission rate for subsequent data transmission from the candidate transmission rates according to the energy utilization rate. In the embodiments, during data transmission, the transmission device first performs "experimental transmission" on data by using at least two candidate transmission rates and determines the energy utilization rate of battery energy during the data transmission at each of the candidate transmission rates, and then selects an appropriate target transmission rate from the candidate transmission rates according to the energy utilization rate. Therefore, the target transmission rate is determined on the basis of the energy utilization rate of the battery energy during a data transmission process corresponding to the candidate transmission rate, so that the power consumption caused by data transmission is taken into consideration while ensuring the completion of the data transmission, thereby facilitating reducing power consumption during data transmission, saving the battery power for the transmission device, prolonging the battery life of the device, and improving the user experience.

Obviously, those of ordinary skill in the art will appreciate that all or some of the steps in the methods, and the functional blocks/elements in the systems disclosed above may be implemented as software (which can be implemented by the program code executable by a computing device), firmware, hardware, and suitable combinations thereof. In a hardware implementation, the division between functional blocks/elements mentioned in the above description does not necessarily correspond to the division of physical components; for example, one physical component may have multiple functions, or one function or step may be co-executed by several physical components. Some or all of the physical components may be implemented as software executed by a processor, such as a central processing unit, a digital signal processor or microprocessor, or as hardware, or as an integrated circuit, such as an application specific integrated circuit. Such software may be distributed on a computer readable medium and executed by the computing device. In some cases, the steps shown or described may be executed in a different order than here. The computer readable medium may include computer storage media (or non-transitory media) and communication media (or transitory media). As is well known to those of ordinary skill in the art, the term computer storage medium includes volatile and nonvolatile, removable and non-removable media implemented in any method or technology for storing information (such as computer readable instructions, data structures, program modules or other data). Computer storage media includes, but is not limited to, RAM, ROM, EEPROM, flash memory or other memory technology, CD-ROM, digital versatile disc (DVD) or other optical disc storage, magnetic cartridge, magnetic tape, magnetic disk storage or other magnetic storage device, or may any other medium used to store desired information and that can be accessed by a computer. Moreover, it is well known to those of ordinary skill in the art that communication media typically includes computer readable instructions, data structures, program modules, or other data in a modulated data signal, such as a carrier wave or other transport mechanism, and may include any information delivery media. As such, the present disclosure is not limited to any specific combination of hardware and software.

The above are further detailed descriptions of the embodiments of the present disclosure in conjunction with specific implementations, but the specific implementations of the present disclosure are not limited to these descriptions. For those of ordinary skill in the technical field to which the present disclosure belongs, several simple deductions or substitutions can be made without departing from the concept of the present disclosure, which should be regarded as being within the protection scope of the present disclosure.

INDUSTRIAL APPLICABILITY

According to a scheme for determining transmission rate provided by the present disclosure, during data transmission, the transmission device first performs "experimental transmission" on data by using at least two candidate transmission rates and determines the energy utilization rate of battery energy during the data transmission at each of the candidate transmission rates, and then selects an appropriate target transmission rate from the candidate transmission rates according to the energy utilization rate. Therefore, the target transmission rate is determined on the basis of the energy utilization rate of the battery energy during a data transmission process corresponding to the candidate transmission rate, so that the power consumption caused by data transmission is taken into consideration while ensuring the completion of the data transmission, thereby facilitating reducing power consumption during data transmission, saving the battery power for the transmission device, prolonging the battery life of the device, and improving the user experience.

The invention claimed is:

1. A method for determining transmission rate, comprising:
   determining at least two candidate transmission rates;
   performing data transmission for a period of time at each of the candidate transmission rates;
   determining an energy utilization rate of battery power consumed during the data transmission at each of the candidate transmission rates; and
   selecting a target transmission rate for subsequent data transmission from the candidate transmission rates according to the energy utilization rate;
   wherein the determining the energy utilization rate of battery power consumed during the data transmission at each of the candidate transmission rates comprises:
   determining an amount of data transmitted at each of the candidate transmission rates and the battery power consumed during the data transmission at each of the candidate transmission rates; and
   determining the energy utilization rate corresponding to each of the candidate transmission rates according to the amount of data and the consumed battery power.

2. The method for determining transmission rate according to claim 1, wherein the selecting the target transmission rate for subsequent data transmission from the candidate transmission rates according to the energy utilization rate comprises:
   selecting a candidate transmission rate corresponding to a highest energy utilization rate as the target transmission rate.

3. The method for determining transmission rate according to claim 1, before the determining at least two candidate transmission rates, further comprising:
   detecting first input information, and determining, according to the first input information, that the energy utilization rate must be preferentially guaranteed during current data transmission;
   and/or,
   determining that no power is input from an external power supply.

4. The method for determining transmission rate according to claim 1, wherein the determining at least two candidate transmission rates comprises: determining at least two candidate transmission rates according to a maximum transmission rate Vmax currently allowed for data transmission.

5. The method for determining transmission rate according to claim 4, wherein the determining at least two candidate transmission rates according to the maximum transmission rate currently allowed for data transmission comprises any one of the following ways:
   selecting $$\frac{k}{N}V\max$$

as the candidate transmission rate, where the N is a positive integer representing the number of candidate transmission rates, and the values of k consist of each of positive integers less than or equal to the N, representing the $k^{th}$ candidate transmission rate among the N candidate transmission rates;

performing communication negotiation with an opposite device for data transmission, determining a minimum transmission rate Vmin according to a result of negotiation, and selecting the Vmax, the $$\frac{V\max + V\min}{2}$$

as the candidate transmission rates;

selecting all odd numbers less than or equal to the Vmax as the candidate transmission rates; and selecting all even numbers less than or equal to the Vmax as the candidate transmission rates.

6. The method for determining transmission rate according to claim 4, before the determining at least two candidate transmission rates according to the maximum transmission rate currently allowed for data transmission, further comprising: determining the maximum transmission rate in any one of the following ways:

performing communication negotiation with an opposite device for data transmission, and determining the maximum transmission rate according to a result of negotiation;

detecting second input information, and determining the maximum transmission rate according to the detected second input information; and performing communication negotiation with an opposite device for data transmission, giving an output prompt by using a result of negotiation, receiving third input information generated according to the output prompt information, and determining the maximum transmission rate according to the third input information.

7. A transmission device, comprising a processor, a memory, a communication unit and a communication bus;

the communication bus configured to realize communication between the processor and the memory and communication between the processor and the communication unit, respectively; and the processor configured to execute one or more programs stored in the memory so as to perform the steps in a method for determining transmission rate, the method comprising:

determining at least two candidate transmission rates;

performing data transmission for a period of time at each of the candidate transmission rates;

determining an energy utilization rate of battery power consumed during the data transmission at each of the candidate transmission rates; and selecting a target transmission rate for subsequent data transmission from the candidate transmission rates according to the energy utilization rate;

wherein the determining the energy utilization rate of battery power consumed during the data transmission at each of the candidate transmission rates comprises:

determining an amount of data transmitted at each of the candidate transmission rates and the battery power consumed during the data transmission at each of the candidate transmission rates; and determining the energy utilization rate corresponding to each of the candidate transmission rates according to the amount of data and the consumed battery power.

8. The transmission device according to claim 7, wherein the selecting the target transmission rate for subsequent data transmission from the candidate transmission rates according to the energy utilization rate comprises:

selecting a candidate transmission rate corresponding to a highest energy utilization rate as the target transmission rate.

9. The transmission device according to claim 7, before the determining at least two candidate transmission rates, the method further comprising:

detecting first input information, and determining, according to the first input information, that the energy utilization rate must be preferentially guaranteed during current data transmission;

and/or, determining that no power is input from an external power supply.

10. The transmission device according to claim 7, wherein the determining at least two candidate transmission rates comprises: determining at least two candidate transmission rates according to a maximum transmission rate Vmax currently allowed for data transmission.

11. The transmission device according to claim 10, wherein the determining at least two candidate transmission rates according to the maximum transmission rate currently allowed for data transmission comprises any one of the following ways:

selecting $$\frac{k}{N}V\max$$

as the candidate transmission rate, where the N is a positive integer representing the number of candidate transmission rates, and the values of k consist of each of positive integers less than or equal to the N, representing the $k^{th}$ candidate transmission rate among the N candidate transmission rates;

performing communication negotiation with an opposite device for data transmission, determining a minimum transmission rate Vmin according to a result of negotiation, and selecting the Vmax, the Vmin and $$\frac{V\max + V\min}{2}$$

as the candidate transmission rates;

selecting all odd numbers less than or equal to the Vmax as the candidate transmission rates; and selecting all even numbers less than or equal to the Vmax as the candidate transmission rates.

12. The transmission device according to claim 10, before the determining at least two candidate transmission rates according to the maximum transmission rate currently allowed for data transmission, the method further comprising: determining the maximum transmission rate in any one of the following ways:

performing communication negotiation with an opposite device for data transmission, and determining the maximum transmission rate according to a result of negotiation;

detecting second input information, and determining the maximum transmission rate according to the detected second input information; and performing communication negotiation with an opposite device for data transmission, giving an output prompt by using a result of negotiation, receiving third input information generated according to the output prompt information, and determining the maximum transmission rate according to the third input information.

13. A non-transitory computer-readable storage medium, wherein the storage medium stores one or more programs that can be executed by one or more processors to perform the steps in a method for determining transmission rate, the method comprising:

determining at least two candidate transmission rates;

performing data transmission for a period of time at each of the candidate transmission rates;

determining an energy utilization rate of battery power consumed during the data transmission at each of the candidate transmission rates; and selecting a target transmission rate for subsequent data transmission from the candidate transmission rates according to the energy utilization rate;

wherein the determining the energy utilization rate of battery power consumed during the data transmission at each of the candidate transmission rates comprises:

determining an amount of data transmitted at each of the candidate transmission rates and the battery power consumed during the data transmission at each of the candidate transmission rates; and determining the energy utilization rate corresponding to each of the candidate transmission rates according to the amount of data and the consumed battery power.

* * * * *